United States Patent

[11] 3,580,257

| [72] | Inventor | Earl E. Teague |
| | | Rte. 1, Box 92, Dermott, Ark. 71638 |
| [21] | Appl. No. | 887,840 |
| [22] | Filed | Dec. 24, 1969 |
| [45] | Patented | May 25, 1971 |

[54] WEED SEED COLLECTOR FOR A THRESHER COMBINE
5 Claims, 6 Drawing Figs.

| [52] | U.S. Cl. | 130/24 |
| [51] | Int. Cl. | A01f 12/42 |
| [50] | Field of Search | 130/24, 27, 27.6; 171/23 |

[56] References Cited
UNITED STATES PATENTS

| 2,609,929 | 9/1952 | King | 130/24 |
| 2,617,425 | 11/1952 | Dion | 130/24 |
| 2,693,068 | 11/1954 | Rodin | 171/23 |
| 2,875,768 | 3/1959 | Belkowski et al. | 130/24 |
| 3,202,154 | 8/1965 | Viebrock | 130/24 |
| 2,633,851 | 4/1953 | Boyer | 130/27.6 |

*Primary Examiner*—Antonio F. Guida
*Attorneys*—A. Yates Dowell and A. Yates Dowell, Jr.

ABSTRACT: Apparatus mounted on a threshing machine or combine for removing and collecting weed and other obnoxious seeds during the threshing operation so that such seeds are not distributed and replanted in the field. The apparatus includes a transverse conveyor mounted on the rear of the combine and located at the discharge position of larger separated tailings, an inclined conveyor and a hopper into which the seeds and tailings are discharged.

Patented May 25, 1971

INVENTOR
EARL E. TEAGUE

BY
ATTORNEYS

Patented May 25, 1971
3,580,257
2 Sheets-Sheet 2
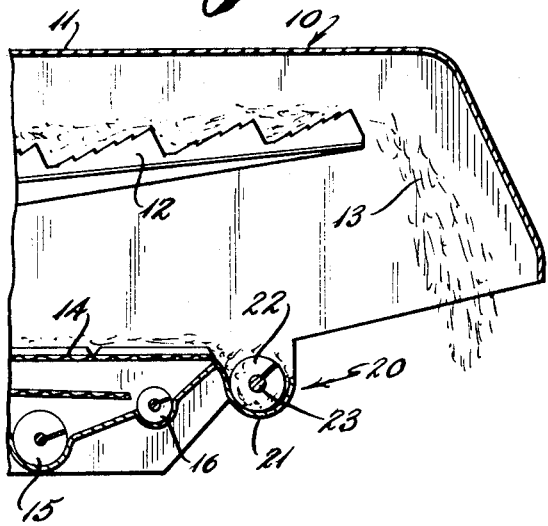
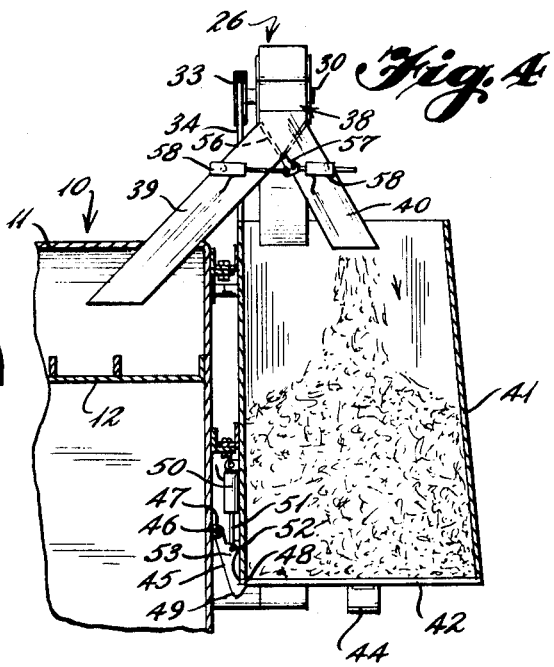
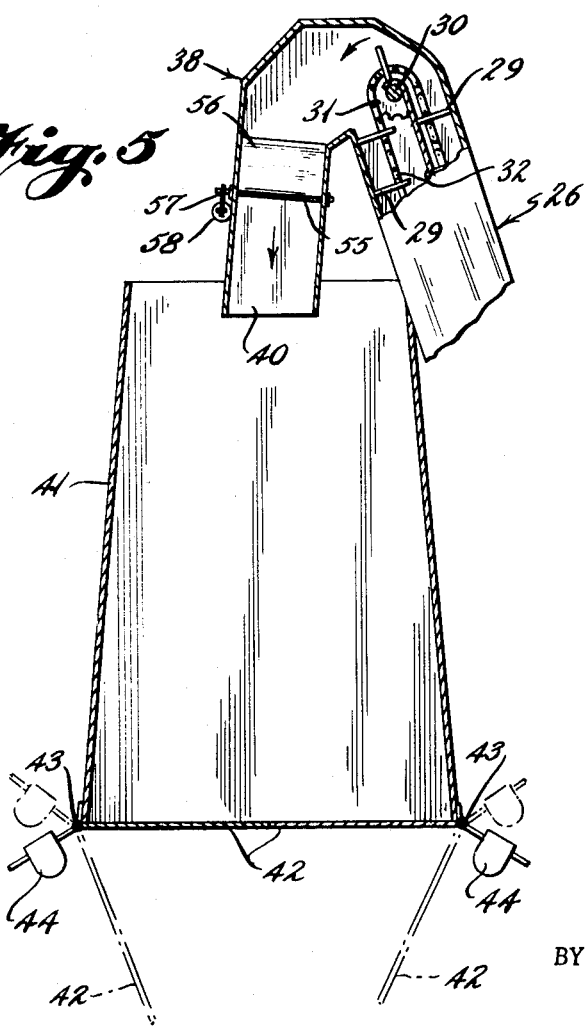
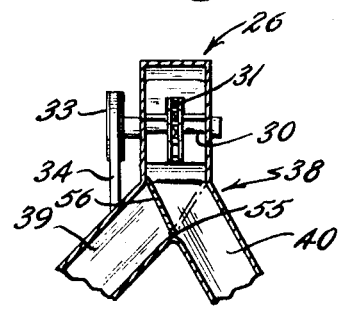
INVENTOR
EARL E. TEAGUE
BY
ATTORNEYS

WEED SEED COLLECTOR FOR A THRESHER COMBINE

BACKGROUND OF THE INVENTION

1. Field of the Invention

This invention relates generally to the harvesting and threshing of agricultural food products and relates particularly to apparatus for collecting weed and other obnoxious seeds to prevent replanting such seeds after the food product has been gathered.

2. Description of the Prior Art

In the past farmers who grew agricultural food products such as soybeans, wheat, rice, corn, rye, hops and the like would harvest their crops and take the same to a stationary threshing machine which would separate the usable food product from the chaff, husks, straw and other unusable products. In doing this the farmer automatically cleared his field of weeds and other obnoxious plants and therefore the weed problem was kept in check.

In order to reduce the cost of labor for harvesting the crop, as well as to make certain that the crop could be harvested at the most appropriate time, mechanized self-propelled threshing machines or combines have been provided which would cut the growing plants, separate the usable food product from the unusable portion of the plant, discharge the food product into appropriate containers, and discharge the plants from the machine where such plants subsequently would be plowed under to add humus to the soil and improve the condition of the same by the decomposition of the plants.

With the advent of the portable threshing machine or combine, weeds and other obnoxious plants are harvested along with the usable food product, and the weed seeds are separated from the weed plants by the threshing cylinder of the combine. However, in many cases the weed seeds have been too large to pass through the grain sieve or screen of the combine and therefore the weed seeds have been discharged from the combine and distributed throughout the field. This has been particularly true of cockleburs, Johnson grass, and other similar weeds and as a result the weeds have presented an increasingly difficult problem.

The labor shortage on farms has become more and more acute, particularly as the farms grew larger and larger. Both hand and mechanized weeding apparatus has been improved; however, these have not been satisfactory since the labor shortage has precluded hand weeding. Mechanized weeders have not been able to distinguish good plants from weeds and accordingly have destroyed more good plants than they have weeds.

Many major chemical companies have spent years trying to develop chemicals which would destroy obnoxious weeds and not harm the useful plants. However, these weed killers are not only expensive to purchase and apply, but have been too selective since they would kill certain weeds while having substantially no effect on other weeds. At the same time the period during which the weed killers could be applied has been extremely critical and if the farmer has been a couple of days late in applying the weed killer due to inclement weather or the like, the weed killer either would have no effect at all or would kill the useful plant as well as the weed. As a general average most farmers have been spending a minimum of $6.00 to $8.00 per acre per year for chemical weed killers. However, these chemicals have not proved sufficiently effective to warrant the cost. Certain of the weed seeds, particularly cockleburs, have resisted most of the weed killers and substantially the only weed killers that would kill cockleburs also would kill the desirable plants.

SUMMARY OF THE INVENTION

The present invention is a weed seed collector which is mounted on a combine and is adapted to collect weed seeds and tailings in a hopper from which the seeds and tailings can be discharged when desired either into a vehicle for disposing of the weed seeds or along the turning row of the field. If desired the pile of material discharged from the hopper can be utilized as food for livestock during the winter months, or if the farmer does not have livestock, the weed seeds and tailings can be destroyed by burning.

During the operation of the combine, vegetation, including both desirable plants and weeds, are cut and fed through a threshing cylinder which separates the usable food product as well as the weed seeds from the plants. The straw, as well as the weed plants, are moved rearwardly through the machine by a straw walker which continually agitates the plants during their passage through the machine. Agitation of the plants causes useful food product and seeds to sift downwardly through the plants where they fall by gravity onto a sieve or shaker screen which normally has adjustable openings therethrough of a desired size. From the shaker screen the useful food product and small tailings fall through the openings while larger tailings, pieces of straw, weed seeds and some useful product are moved rearwardly and discharged from the rear of the machine. The clean food product and small tailings which fall through the shaker screen are subjected to a blast of air to separate the lighter tailings from the useful product and thereafter the useful product is discharged into a trough having a transverse conveyor or auger therein and moved to an appropriate storage area. The tailings are discharged into a trough having a tailings auger or conveyor therein from which the tailings are fed back into the combine and reprocessed.

Ideally the shaker screen is adjusted to permit the maximum amount of usable product to fall through the openings by gravity with a minimum of tailings. Obviously not all of the usable product will fall through the screen and therefore a small portion of the usable product will be discharged from the rear of the machine together with the larger tailings and pieces of loose straw. When a field is relatively clean or devoid of weeds, the material gathered by the cross conveyor of the present invention can be discharged back onto the straw walker so that the usable product will sift through the straw and again be discharged onto the shaker screen to recover substantially all of the useful product.

It is an object of the invention to provide a weed seed collector including a transverse conveyor, an elevator and a hopper which will collect cockleburs and other obnoxious weed seeds being discharged from a combine and place such seeds in a hopper for subsequent disposal.

Another object of the invention is to provide a weed seed collector which can be incorporated as an integral part of a combine or can be used as an attachment to an existing combine.

BRIEF DESCRIPTION OF THE DRAWINGS

FIG. 3 is a fragmentary longitudinal section on the line 3-3 of FIG. 2 illustrating the location of the present device.

FIG. 4 is a section taken on the line 4-4 of FIG. 1.

FIG. 5 is a section on the line 5-5 of FIG. 2.

FIG. 6 is a fragmentary section on the line 6-6 of FIG. 1.

DESCRIPTION OF THE PREFERRED EMBODIMENT

Figure 1:
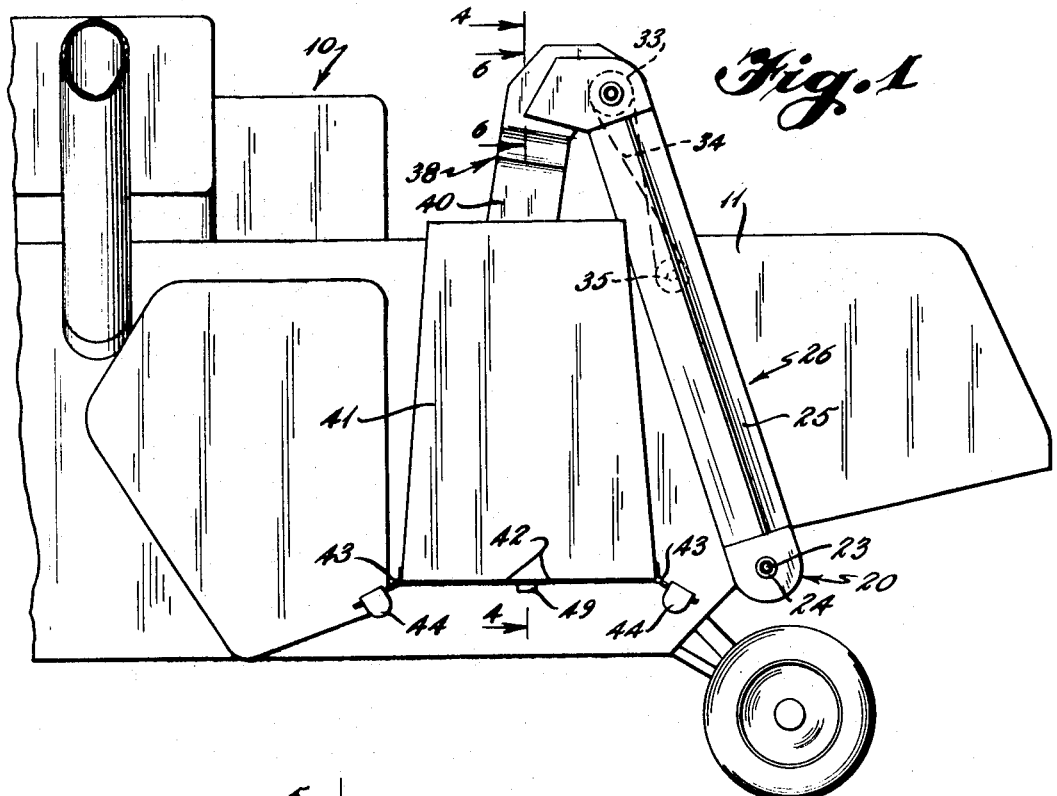
FIG. 1 is a side elevation of the rear portion of a combine illustrating one application of the invention.
Figure 2:
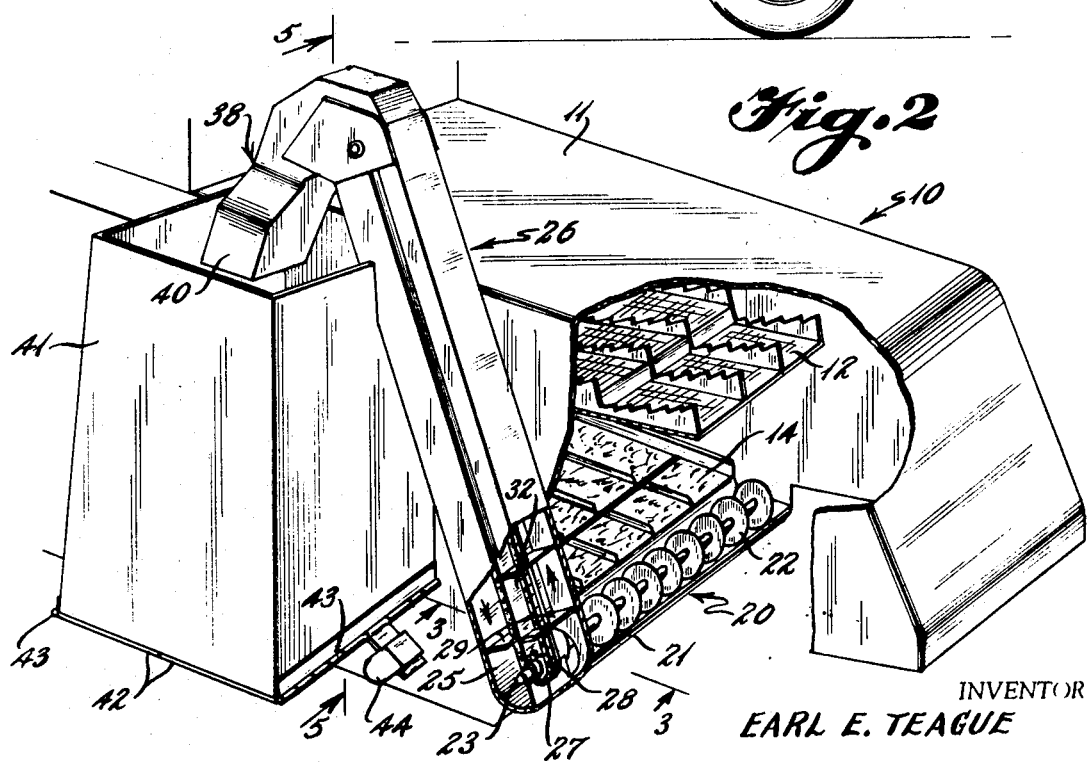
FIG. 2 is a rear perspective thereof with portions broken away.

With continued reference to the drawings, a self-propelled threshing machine or combine 10 is provided with an upper housing 11 in which an agitating straw walker 12 is disposed. The straw walker receives straw 13 or the body of harvested plants from the threshing cylinder after the cylinder has removed the grain, beans, corn or other usable crop from the plants. During its passage through the machine, the straw 13 is agitated and pulled apart so that any useful crop which has been separated from the straw but which is entangled therein can sift through and fall by gravity from the straw walker.

Most of the grain, beans or other useful crop falls through openings in the vicinity of the threshing cylinder and gravitates onto a shaker screen or sieve 14 together with pieces of straw or other tailings including husks. The shaker screen is provided with a plurality of adjustable openings through which the useful product is discharged along with small pieces of tailings. The material which falls by gravity through the shaker screen is subjected to a blast of air from a blower (not shown). The usable product will fall through the stream of air and is directed to a trough having a clean grain auger 15 therein or other conveyor, while the lighter tailings are forced rearwardly of the machine into a trough having a tailings auger or conveyor 16. The clean product is discharged into a hopper or other storage area, such as a truck or wagon located beside the combine.

It is inevitable that some of the useful product will be blown into the tailings auger trough by the blast of air and therefore such material normally is directed back to the threshing cylinder or the shaker screen to again pass through the machine. The openings in the shaker screen 14 are adjusted so that the greatest amount of useful product will be discharged therethrough with the least amount of tailings. However, some of the useful product will pass over the shaker screen and be discharged from the rear of the combine along with large tailings which do not pass through the openings of the shaker screen.

The structure thus far described is conventional in the prior art and forms no part of the present invention.

At the rear of the combine a transverse auger or conveyor 20 is connected to the housing 11 adjacent to the shaker screen 14 in a position to receive material therefrom. As illustrated the transverse conveyor 20 includes a trough 21 with an auger 22 rotatably mounted therein for moving material laterally to one side of the combine. If desired the auger 22 could be replaced by an endless chain or other type conveyor. The auger 22 includes a shaft 23 journaled in bearings 24 at opposite ends and such shaft is adapted to be driven in a manner to be described later.

The conveyor 20 moves material transversely of the combine and discharges such material into a housing 25 which is located along the side of the housing 11 and normally extends above the same. Within the housing 25 is located an elevator or conveyor 26 which, as illustrated, may be of a chain type but which also could be of the air, auger, or other type. As disclosed the elevator 26 includes a lower sprocket 27 mounted on the shaft 23 and adapted to receive a chain 28 on which paddles or plates 29 are mounted. A stub shaft 30 is rotatably mounted in the upper portion of the housing 25 and such stub shaft supports a drive sprocket 31 which receives the upper end of the chain 28. Preferably a divider plate or baseplate 32 is located across the housing 25 between the sprockets 27 and 21 so that material engaged by the paddles 29 will be raised to the top of the elevator 26.

In order to drive the conveyor 26, the stub shaft 30 extends outwardly from the housing 25. A pulley 33 is fixed to the outwardly extending portion of the shaft 30 and such pulley is driven by a belt 34 from a drive pulley 35 (FIG. 1) mounted on a transverse shaft driven by the combine 10. Rotation of the pulleys 33 and 35 drives the elevator 26 and the elevator drives the conveyor 20 by means of the lower sprocket 27 mounted on the auger shaft 23.

An inverted Y-shaped head 38 is mounted on the upper portion of the housing 25 in a position to receive material from the elevator 26. A first leg or chute 39 of the head 38 directs material downwardly through the housing 11 and discharges such material onto the straw walker 12. The other leg or chute 40 is adapted to direct material into a hopper 41 mounted on the side of the housing 11. The hopper 41 may be of any desired configuration although a hopper having tapered walls, as illustrated in FIGS. 1 and 4, has been found satisfactory. As illustrated, the hopper is larger at the bottom than it is at the top to prevent any bridging of the material when the hopper is discharging material therefrom. If desired the top of the hopper may be open and the bottom of the hopper may be closed by one or more doors 42 which can be selectively opened in any desired manner. As illustrated, a pair of doors are provided each of which is swingably mounted on a hinge 43 at opposite sides of the hopper, and each of such doors is provided with a counterweight 44 for automatically closing the same.

In order to maintain the doors 42 in closed position, a latch 45 is swingably connected by a pivot pin 46 to lugs 47 carried by the housing 10. The lower end of the latch 45 includes a shoulder 48 connected to an inclined surface or wedge 49 and such shoulder is adapted to be disposed below the doors 42 to maintain such doors in closed position. To open the doors, a solenoid 50 is mounted on the hopper 41 and the core 51 of such solenoid is connected by a pivot pin 52 to lugs 53 carried by the latch 45. When the solenoid 50 is energized, the core 51 will be extended to cause the latch 45 to swing about the pin 46 and remove the shoulder 48 from beneath the doors to permit the weight of the material within the hopper to open the doors so that such material will be discharged. After the material has been discharged, the counterweights 44 will pivot the doors 42 upwardly and such doors will strike the inclined surface 49 to pivot the latch 45 out of the way and permit the doors to return to closed position.

In order to selectively direct material from the elevator 26 into either of the legs 39 or 40, a shaft 55 extends through the Y-shaped head 38 substantially at the apex of the legs 39 and 40. A flapper valve or plate 56 is welded or otherwise attached to the shaft 55 within the head 38 and such valve is adapted to selectively close either of the legs 39 or 40. To control the position of the flapper valve, the shaft 55 is provided with an operating lever 57 and such lever is adapted to be moved back and forth in any desired manner, as by a pair of swingably mounted solenoids 58 under the control of the combine operator. It is noted that a single solenoid with a spring return or one or more fluid cylinders could be utilized in place of the solenoids 58.

In the operation of the device, as the combine moves through a field, all plants in its path are cut and moved through the threshing cylinder where the usable product is separated from the chaff or straw. The straw moves through the combine by means of the straw walker 12 and is discharged from the rear of the machine. Usable products and tailings fall to the shaker screen 14 where the usable product and small seeds pass through the openings therein while the larger tailings and obnoxious seeds, such as cockleburs and the like, are moved along the shaker screen 14 and discharged from the machine. In areas of heavy weed infestation, one of the solenoids 58 is operated to move the valve 56 so that it covers the chute 39. Material from the shaker screen 14 will be discharged onto the conveyor 20 and moved transversely of the machine into the elevator 26 where such material will be carried upwardly and discharged into the head 38. With the valve 56 closing the chute 39, all of the material will be discharged into the hopper 41. Periodically the solenoid 50 will be operated to release the latch 45 from beneath the doors 42 and permit the material within the hopper to be discharged by gravity after which the doors 42 will close automatically. The material discharged from the hopper can subsequently be destroyed by burning or the like, or can be left in piles for feeding livestock during the winter.

In areas of little weed infestation, the operator of the combine can watch for weeds so that he can control the position of the flapper valve 56. When no weeds are being processed, the flapper valve 56 can be moved to close the chute 40 and direct the material from the elevator 26 back to the straw walker 12 so that grain, beans and other useful product which was discharged from the shaker screen 14 will be reprocessed to save the useful product which formerly had been lost. When weeds are encountered the operator of the combine merely pushes a button to energize the solenoid 58 and swing the flapper valve 56 to a position closing the chute 39 to direct the material into the hopper. When the operator is certain that the weeds have passed through the machine, he can operate the solenoids 58 in the reverse direction to close the chute 40 and again direct material onto the straw walker 12.

I claim:

1. In a threshing combine having a housing with a straw walker, a shaker screen, said shaker screen comprising means for separating the combined material into clean grain, tailings, and a mixture of grain, tailings and weed seeds, a clean grain auger, and a tailings auger located within the housing, the improvement comprising a weed seed collector including a transverse conveyor located exteriorly of said housing and in a position to receive said mixture from said shaker screen, means for driving said transverse conveyor to move said mixture to one side of said housing, an elevator disposed along one side of said housing and adapted to receive said mixture from said conveyor and raise the same to an elevated position for discharge, a collection receptacle mounted on the exterior of said housing adjacent to the discharge end of said elevator, a head mounted on the discharge end of said elevator, said head including first chute means for discharging said mixture from said elevator into said collection receptacle and second chute means for discharging said mixture from said elevator onto said straw walker, plate means swingably mounted in said head and adapted to selectively close one of said first and second chute means, means for selectively operating said plate means from a remote position, and means for selectively discharging said mixture from said collection receptacle, so that the mixture of grain, tailings and weed seeds discharged from said shaker screen can be discharged into said collection receptacle during the threshing operation and can be selectively discharged from the collection receptacle when desired.

2. The structure of claim 1 in which said means for discharging said mixture from said collection receptacle includes door means at the bottom of said receptacle.

3. The structure of claim 2 including means operable from a remote position for selectively releasing said door means so that the weight of the mixture within said receptacle will open said door means.

4. The structure of claim 2 including means for automatically closing said door means when the mixture has been discharged.

5. The structure of claim 1 in which said transverse conveyor includes a trough with a auger therein.